(12) United States Patent
Li et al.

(10) Patent No.: US 12,427,967 B2
(45) Date of Patent: Sep. 30, 2025

(54) CONFIGURATION CONTROL METHOD AND CONTROL SYSTEM FOR ELECTRONIC MECHANICAL BRAKE-BY-WIRE SYSTEM

(71) Applicant: INSTITUTE OF ELECTRICAL ENGINEERING, CHINESE ACADEMY OF SCIENCES, Beijing (CN)

(72) Inventors: Xiaolong Li, Beijing (CN); Lifang Wang, Beijing (CN); Junzhi Zhang, Beijing (CN); Chengkun He, Beijing (CN); Dongsheng Sun, Beijing (CN); Junfeng Zhang, Beijing (CN)

(73) Assignee: Institute of Electrical Engineering, Chinese Academy of Sciences, Beijing (CN)

( * ) Notice: Subject to any disclaimer, the term of this patent is extended or adjusted under 35 U.S.C. 154(b) by 66 days.

(21) Appl. No.: 18/637,973

(22) Filed: Apr. 17, 2024

(65) Prior Publication Data

US 2024/0262333 A1   Aug. 8, 2024

Related U.S. Application Data

(63) Continuation of application No. PCT/CN2022/101750, filed on Jun. 28, 2022.

(30) Foreign Application Priority Data

Oct. 19, 2021   (CN) .................. 202111214257.3

(51) Int. Cl.
*B60T 13/74*   (2006.01)
*B60T 17/22*   (2006.01)

(52) U.S. Cl.
CPC .......... *B60T 13/741* (2013.01); *B60T 17/221* (2013.01); *B60T 2270/406* (2013.01)

(58) Field of Classification Search
CPC ........ B60T 13/74; B60T 13/741; B60T 17/22; B60T 17/221; B60T 2270/406
See application file for complete search history.

(56) References Cited

U.S. PATENT DOCUMENTS 5,107,967 A * 4/1992 Fujita ..................... F16D 65/18
                                                      188/72.1
6,189,661 B1 * 2/2001 Schaffer .................. F16D 65/18
                                                      188/72.8

(Continued)

FOREIGN PATENT DOCUMENTS

CN   108105286 A   6/2018
CN   109733367 A   5/2019

(Continued)

OTHER PUBLICATIONS

International Search Report in counterpart International Application No. PCT/CN2022/101750, mailed Sep. 22, 2022, 7 pages.

*Primary Examiner* — Carl C Staubach
(74) *Attorney, Agent, or Firm* — Edell, Shapiro & Finnan, LLC

(57) ABSTRACT

A configuration control method for an electronic mechanical brake-by-wire system is Provided. The control method includes: acquiring a first actual output torque measured by the first torque sensor and a second actual output torque measured by the second torque sensor; if a received signal is a brake loading signal, separately comparing a first difference with an initial torque difference and a maximum torque difference when a motor fails to obtain a comparison result, where the first difference is an absolute value of a difference between the first actual output torque and the second actual output torque; and controlling the first motor and the second motor according to the comparison result to complete brake loading by means of the brake actuator. Also provided is a configuration control system for an electronic (Continued)

mechanical brake-by-wire system. The control method and the control system can achieve synchronous and precise control of a brake force.

10 Claims, 3 Drawing Sheets

(56) References Cited

U.S. PATENT DOCUMENTS

| | | | | |
|---|---|---|---|---|
| 6,536,561 | B1* | 3/2003 | Keller | H02K 7/06 |
| | | | | 188/162 |
| 8,292,042 | B2* | 10/2012 | Kim | F16D 65/18 |
| | | | | 188/162 |
| 9,447,830 | B2* | 9/2016 | Bull | F16D 65/18 |
| 10,800,391 | B2* | 10/2020 | Poertzgen | F16D 65/18 |
| 11,187,292 | B2* | 11/2021 | Song | B60T 8/17 |
| 11,572,051 | B2* | 2/2023 | Binder | B60T 8/172 |
| 11,608,043 | B2* | 3/2023 | Ohkubo | F16D 55/226 |
| 11,821,479 | B2* | 11/2023 | Chelaidite | F16D 55/226 |
| 12,252,104 | B2* | 3/2025 | Baek | F16D 65/18 |
| 12,370,988 | B2* | 7/2025 | Zhang | B60T 8/17616 |
| 2004/0124042 | A1 | 7/2004 | Kriz | |
| 2008/0224533 | A1* | 9/2008 | Nakada | B60T 8/4059 |
| | | | | 303/10 |
| 2016/0349129 | A1* | 12/2016 | Pagani | G01L 15/00 |

FOREIGN PATENT DOCUMENTS

| | | |
|---|---|---|
| CN | 112550256 A | 3/2021 |
| CN | 114087302 A | 2/2022 |
| EP | 1359338 A2 | 11/2003 |

\* cited by examiner

CONFIGURATION CONTROL METHOD AND CONTROL SYSTEM FOR ELECTRONIC MECHANICAL BRAKE-BY-WIRE SYSTEM

CROSS REFERENCE TO RELATED APPLICATIONS

This application is a continuation of International Patent Application No. PCT/CN2022/101750, filed on Jun. 28, 2022, which claims the priority to the Chinese Patent Application No. 202111214257.3, filed with the China National Intellectual Property Administration (CNIPA) on Oct. 19, 2021, and entitled "CONFIGURATION CONTROL METHOD AND CONTROL SYSTEM FOR ELECTRONIC MECHANICAL BRAKE-BY-WIRE SYSTEM", each of which is incorporated herein by reference in its entirety.

TECHNICAL FIELD

The present disclosure relates to the field of electric vehicle braking, and in particular, to a configuration control method and control system for an electronic mechanical brake-by-wire system.

BACKGROUND

An electromechanical braking system (EMB) system replaces a complex hydraulic (pneumatic) pipeline structure in the conventional brake system, has the advantages of short response time, convenience in assembly and maintenance, etc., and therefore will gradually become the development direction of electric vehicle brake solutions in the future. To prevent the brake failure caused by the failure of a motor or the disconnection of a system circuit during braking, it is necessary to design the EMB system from the perspective of mechanism redundancy to improve the safety and reliability of the system.

At present, there are mainly two types of EMB brake-by-wire systems that adopt a dual-motor redundant configuration: a high-reliability EMB brake-by-wire system and a control method therefor and a high-stability EMB brake-by-wire brake system suitable for an antilock braking system (ABS) and a control method therefor. The high-reliability EMB brake-by-wire system has the following technical problems: (i) as a feedback signal to control a brake force, a brake clearance collected by a position sensor is difficult to control the brake force accurately; (ii) along with the frictional thinning of a brake friction block, the brake clearance will gradually decrease, and a brake force control strategy based on the brake clearance will fail; and (iii) during normal brake loading, only a single motor is for torque output, the other motor does not play a role, and therefore, the usage efficiency of the motors is low, and the maximum performance of the dual motors cannot be exerted. The high-stability EMB brake-by-wire brake system suitable for an antilock braking system (ABS) has the following technical problems: (i) when both motors are in normal use, due to a difference between a ball screw and a threaded screw mechanism, during brake loading, it is difficult to achieve synchronous and precise control of a brake force; (ii) the friction coefficient of a threaded screw is large, the transmission efficiency of a mechanism is low, and there is no fast response characteristics during frequent braking; and (iii) once the motor driving the threaded screw fails during brake loading, due to self-locking characteristics of the threaded screw, the mechanism will be unable to complete brake release, resulting in brake lockup. The existing EMB brake-by-wire systems all have the problem of difficulty in synchronous and precise control.

SUMMARY

On this basis, embodiments of the present disclosure provide a configuration control method and control system for an electronic mechanical brake-by-wire system, to achieve synchronous and precise control of a brake force.

To achieve the above objective, the present disclosure provides the following solutions:

a configuration control method for an electronic mechanical brake-by-wire system, where the control method is used for a dual-synchronous-motor electronic mechanical brake-by-wire system configuration, and the dual-synchronous-motor electronic mechanical brake-by-wire system configuration includes:

an electric control unit (ECU), a first motor, a second motor, a first torque sensor, a second torque sensor, and a brake actuator, where the ECU is electrically connected to the first motor and the second motor; the first torque sensor is connected to an output shaft of the first motor; the second torque sensor is connected to an output shaft of the second motor; both the first torque sensor and the second torque sensor are electrically connected to the ECU; and both an output shaft of the first torque sensor and an output shaft of the second torque sensor are connected to the brake actuator; and the control method includes:

acquiring a first actual output torque measured by the first torque sensor and a second actual output torque measured by the second torque sensor;

if a received signal is a brake loading signal, separately comparing a first difference with an initial torque difference and a maximum torque difference when a motor fails to obtain a comparison result, where the first difference is an absolute value of a difference between the first actual output torque and the second actual output torque; and controlling the first motor and the second motor according to the comparison result to complete brake loading by means of the brake actuator, where the initial torque difference is less than the maximum torque difference.

Optionally, the controlling the first motor and the second motor according to the comparison result specifically includes:

when the comparison result is that the first difference is less than the initial torque difference, maintaining a current output torque of the first motor and a current output torque of the second motor;

when the comparison result is that the first difference is greater than or equal to the initial torque difference and less than the maximum torque difference, respectively performing synchronous compensation adjustment on an output torque of the first motor and an output torque of the second motor; and when the comparison result is that the first difference is greater than or equal to the maximum torque difference, determining a failed motor, controlling the failed motor to stop operating, and controlling a normal motor to output according to a target torque, where the target torque is a sum of a first target brake torque of the first motor and a second target brake torque of the second motor.

Optionally, the respectively performing synchronous compensation adjustment on an output torque of the first motor and an output torque of the second motor specifically includes:

calculating torque compensation amounts of the motors according to the first difference and compensation variable coefficients of the motors; and compensating for the output torque of the first motor according to the torque compensation amount of the first motor, and compensating for the output torque of the second motor according to the torque compensation amount of the second motor.

Optionally, the determining a failed motor specifically includes:

when a second difference is greater than or equal to the maximum torque difference and a third difference is less than the maximum torque difference, determining that the first motor is the failed motor and the second motor is the normal motor, where the second difference is an absolute value of a difference between the first actual output torque and a set torque, the third difference is an absolute value of a difference between the second actual output torque and the set torque, and the set torque is half of the target torque; and when the third difference is greater than or equal to the maximum torque difference and the second difference is less than the maximum torque difference, determining that the second motor is the failed motor and the first motor is the normal motor.

Optionally, after the acquiring a first actual output torque measured by the first torque sensor and a second actual output torque measured by the second torque sensor, the control method further includes:

if a received signal is a brake release signal, determining whether both the first actual output torque and the second actual output torque are zero, and if so, controlling both the first motor and the second motor to reversely rotate by a set angle to complete brake release by means of the brake actuator.

Optionally, before the acquiring a first actual output torque measured by the first torque sensor and a second actual output torque measured by the second torque sensor, the control method further includes:

if a received signal is a brake loading signal, sending a first target brake torque signal to the first motor, and sending a second target brake torque signal to the second motor.

Optionally, before the acquiring a first actual output torque measured by the first torque sensor and a second actual output torque measured by the second torque sensor, the control method further includes:

if a brake release signal is received, sending a first brake release signal to the first motor, and sending a second brake release signal to the second motor.

The present disclosure further provides a configuration control system for an electronic mechanical brake-by-wire system, where the control system is for a dual-synchronous-motor electronic mechanical brake-by-wire system configuration, and the dual-synchronous-motor electronic mechanical brake-by-wire system configuration includes:

an ECU, a first motor, a second motor, a first torque sensor, a second torque sensor, and a brake actuator, where the ECU is electrically connected to the first motor and the second motor;

the first torque sensor is connected to an output shaft of the first motor; the second torque sensor is connected to an output shaft of the second motor; both the first torque sensor and the second torque sensor are electrically connected to the ECU; and both an output shaft of the first torque sensor and an output shaft of the second torque sensor are connected to the brake actuator; and the control system includes:

a torque acquisition module, configured to acquire a first actual output torque measured by the first torque sensor and a second actual output torque measured by the second torque sensor;

a torque comparison module, configured to separately compare, if a received signal is a brake loading signal, a first difference with an initial torque difference and a maximum torque difference when a motor fails to obtain a comparison result, where the first difference is an absolute value of a difference between the first actual output torque and the second actual output torque; and a brake loading control module, configured to control the first motor and the second motor according to the comparison result to complete brake loading by means of the brake actuator, where the initial torque difference is less than the maximum torque difference.

Optionally, the brake loading control module specifically includes:

a motor control unit, configured to maintain, when the comparison result is that the first difference is less than the initial torque difference, a current output torque of the first motor and a current output torque of the second motor;

a synchronous compensation unit, configured to respectively perform, when the comparison result is that the first difference is greater than or equal to the initial torque difference and less than the maximum torque difference, synchronous compensation adjustment on an output torque of the first motor and an output torque of the second motor; and a failed motor determination unit, configured to determine, when the comparison result is that the first difference is greater than or equal to the maximum torque difference, a failed motor, control the failed motor to stop operating, and control a normal motor to output according to a target torque, where the target torque is a sum of a first target brake torque of the first motor and a second target brake torque of the second motor.

Optionally, the synchronous compensation unit specifically includes:

a compensation amount calculation sub-unit, configured to calculate torque compensation amounts of the motors according to the first difference and compensation variable coefficients of the motors; and a motor compensation sub-unit, configured to compensate for the output torque of the first motor according to the torque compensation amount of the first motor, and compensate for the output torque of the second motor according to the torque compensation amount of the second motor.

Compared with the prior art, the present disclosure has the following beneficial effects:

Embodiments of the present disclosure provide a configuration control method and control system for an electronic mechanical brake-by-wire system. The control method is used for a dual-synchronous-motor electronic mechanical brake-by-wire system configuration. The control method includes: if a received signal is a brake loading signal, acquiring a first actual output torque measured by a first torque sensor and a second actual output torque measured by a second torque sensor, separately comparing an absolute value of a difference between the first actual output torque and the second actual output torque with an initial torque difference and a maximum torque difference when a motor fails, and controlling a first motor and a second motor according to a comparison result to complete brake loading by means of a brake actuator. In the present disclosure, output torques of the motors are monitored in real time, and the motors are controlled according to the comparison result of the output torques of the motors, such that the control of the brake performance of the motors is more accurate and direct, and the synchronous and precise control of a brake force can be achieved.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In order to make the above objective, features and advantages of the present disclosure clearer and more comprehensible, the present disclosure will be further described in detail below in combination with accompanying drawings and particular implementation modes.

Figure 1:
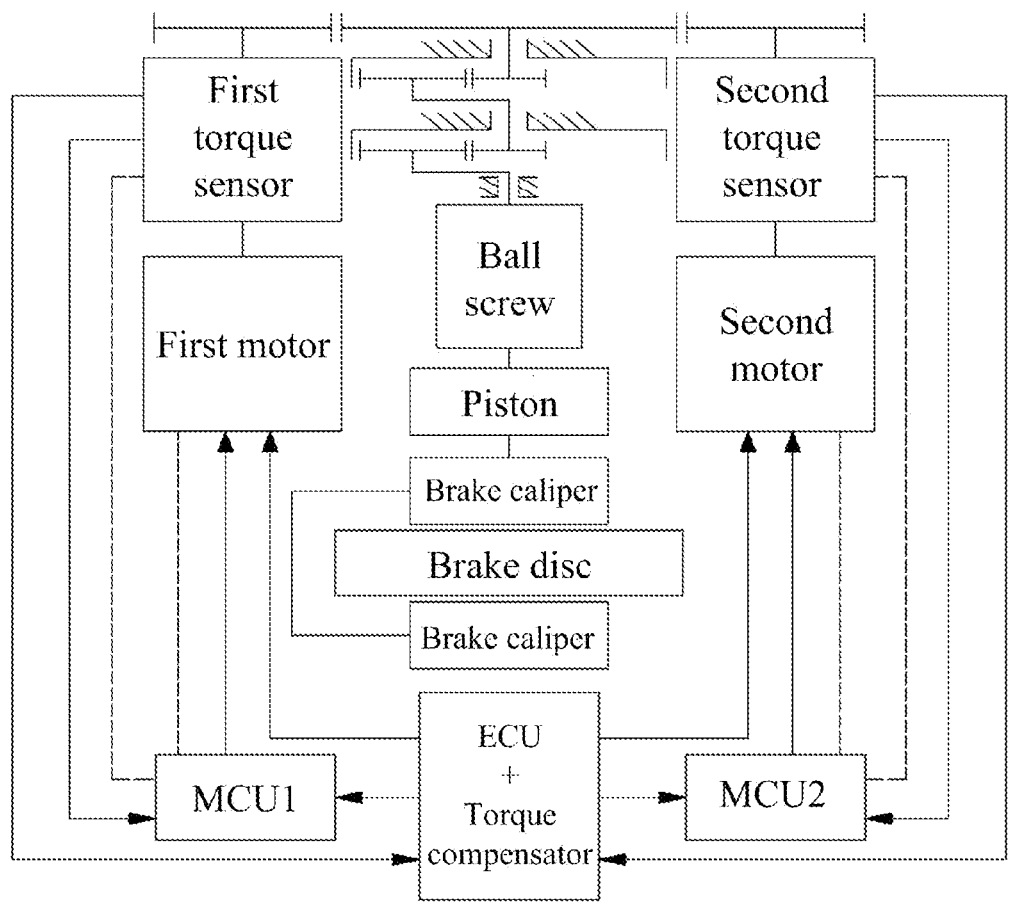
FIG. 1 is a structural diagram of a dual-synchronous-motor electronic mechanical brake-by-wire system configuration according to embodiments of the present disclosure.

A configuration control method for an electronic mechanical brake-by-wire system provided by the present embodiment is for a dual-synchronous-motor electronic mechanical brake-by-wire system configuration. A dual-synchronous-motor electronic mechanical brake-by-wire system configuration is introduced first. Referring to FIG. 1, the dual-synchronous-motor electronic mechanical brake-by-wire system configuration includes:

an ECU, a first motor, a second motor, a first torque sensor, a second torque sensor, and a brake actuator, where the ECU is electrically connected to the first motor and the second motor; the first torque sensor is connected to an output shaft of the first motor; the second torque sensor is connected to an output shaft of the second motor; both the first torque sensor and the second torque sensor are electrically connected to the ECU; and both an output shaft of the first torque sensor and an output shaft of the second torque sensor are connected to the brake actuator. The first motor and the second motor may be two servo motors of the same model. The ECU supplies power to the first motor, the second motor, the first torque sensor, and the second torque sensor. In FIG. 1, the straight lines represent mechanical connections, the arrows represent electrical connections (to implement signal transmission), and the dotted lines represent electrical energy transmission (to implement power supply).

In one example, the ECU is electrically connected to the first motor through a first controller (MCU1), and the ECU is electrically connected to the second motor through a second controller (MCU2). The dual motors are controlled by two independent sets of controllers. The two are physically isolated from each other without interference and are redundant with each other. This can avoid brake failure caused by the failure of a motor, a circuit, and a torque sensor on one side, thereby improving the reliability of a brake system. During brake loading, the ECU sends target brake torque signals to the first controller and the second controller respectively, and controls the first motor and the second motor of the same model to generate brake torque at the same time. Output shafts of the two motors are respectively connected to two torque sensors for detection and feedback of output torques of the motors. Output shafts of the torque sensors are connected to a brake actuator, and the brake actuator completes brake loading. During brake release, the ECU sends brake release signals to the first controller and the second controller respectively, and the two motors reversely rotate until the torque sensors monitor that the output torques are zero, and continuous rotating reversely by a fixed angle to complete brake release and implement automatic adjustment of a brake clearance.

Figure 2:
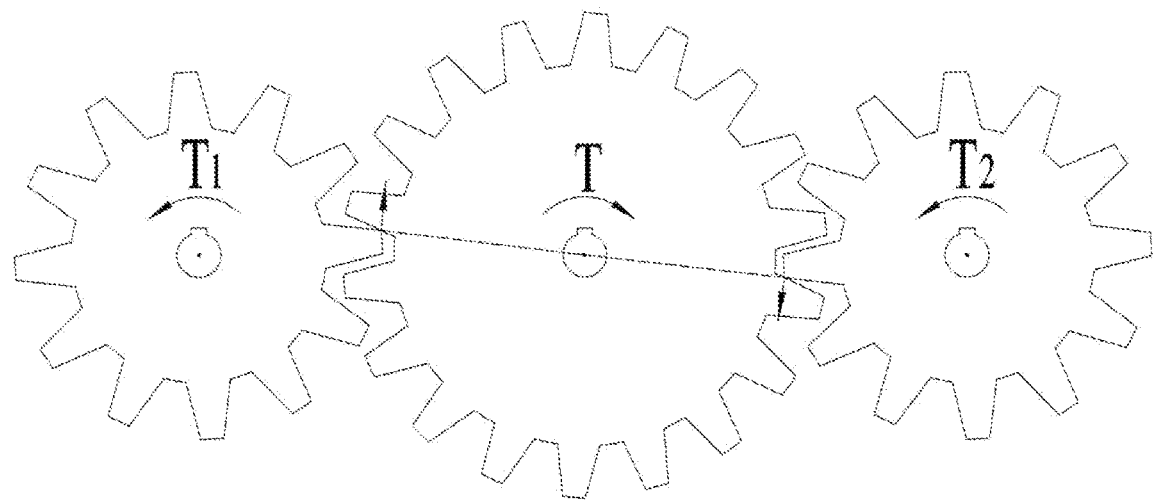
FIG. 2 is a schematic diagram of superimposing torques, output by two torque sensors, by a planetary gear reducer according to embodiments of the present disclosure.

In one example, the brake actuator includes a planetary gear reducer, a ball screw, a piston, and a brake member. The output shaft of the first torque sensor and the output shaft of the second torque sensor are connected to the planetary gear reducer by means of gears, an output shaft of the planetary gear reducer is connected to the ball screw, and the ball screw is connected to the brake member by means of the piston. The brake member includes a brake disc and a brake caliper. The brake caliper is connected to the piston. When a vehicle is driving, the brake disc rotates with wheels, but the brake caliper is fixed. When receiving a brake loading signal, as shown in FIG. 2, the planetary gear reducer superimposes torques ($T_1$ and $T_2$) output by the two torque sensors and transmits the superimposed torque ($T$) to the ball screw, a screw nut on the ball screw transmits the superimposed torque translationally to the piston, thereby squeezing the brake caliper, and the brake caliper clamps the brake disc to complete brake loading.

The specific working principle of the dual-synchronous-motor electronic mechanical brake-by-wire system configuration is as follows:

When the ECU of the dual-synchronous-motor electronic mechanical brake-by-wire system configuration receives the brake loading signal, the ECU sends a first target brake torque signal to the first controller and sends a second target brake torque signal to the second controller, to control the first motor to output a first actual output torque and control the second motor to output a second actual output torque.

Figure 3:
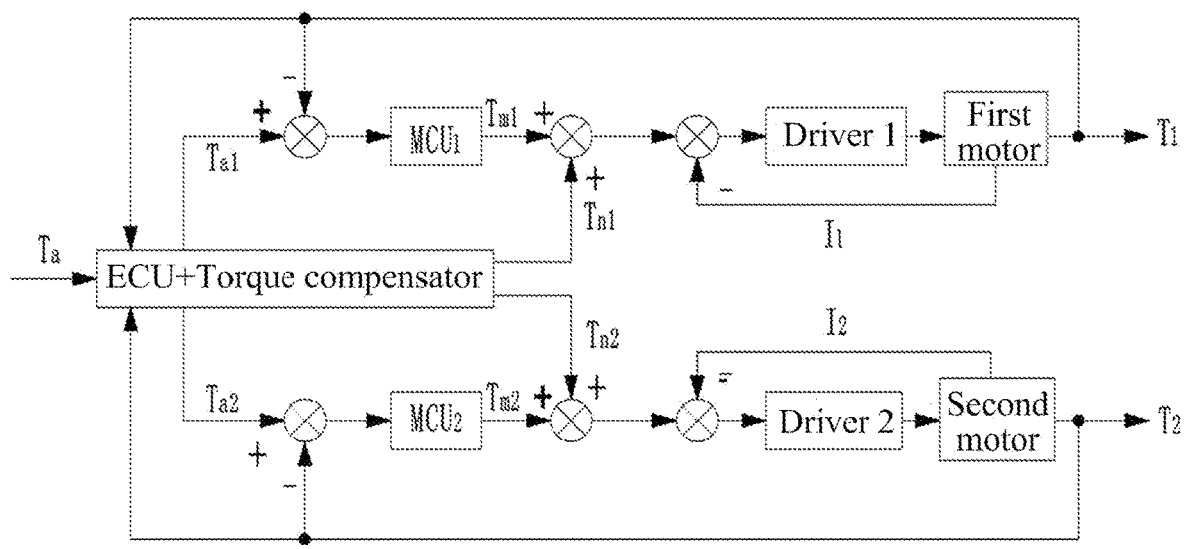
FIG. 3 is a schematic diagram of compensation according to embodiments of the present disclosure.

The first torque sensor sends the measured first actual output torque to the ECU through the first controller, and the second torque sensor sends the measured second actual output torque to the ECU through the second controller. A torque compensator is built in the control unit. The control unit compensates for motor torques output by the first motor and the second motor according to the first actual output torque and the second actual output torque. The brake actuator completes brake loading according to the first actual output torque and the second actual output torque. The compensation principle is shown in FIG. 3. The ECU includes a control part ECU and a torque compensator. The first motor is driven by a first driver, and the second motor is driven by a second driver. The control part ECU sends, to the first controller and the second controller, torque requirements for the motors to output the first target brake torque $T_{a1}$ and the second target brake torque $T_{a2}$. A motor servo control system is in a double closed-loop form, an outer loop is a torque loop, and the output torque signal of each motor fed back by the torque sensors serves as an input signal of an inner loop-a current loop. In addition, the torque compensator calculates an output torque difference of the two motors to determine whether to perform torque compensation for each motor, where $T_a$ is a total target torque, $T_{a1}$ is a target torque of the first motor, $T_{a2}$ is a target torque of the second motor, $T_{m1}$ is a torque output by a closed-loop torque regulator of the first motor, $T_{m2}$ is a torque output by a closed-loop torque regulator of the second motor, $T_{n1}$ is a torque compensation amount of the first motor, $T_{n2}$ is a torque compensation amount of the second motor, $T_1$ is an actual output torque of the first motor, $T_2$ is an actual output torque of the second motor, $I_1$ is the current of the first motor, and $I_2$ is the current of the second motor.

When the ECU of the dual-synchronous-motor electronic mechanical brake-by-wire system configuration receives a brake release signal, the ECU sends a first brake release signal to the first controller and sends a second brake release signal to the second controller. Both the first motor and the second motor rotate reversely. When both the received first actual output torque measured by the first torque sensor and the received second actual output torque measured by the second torque sensor are zero, the first motor and the second motor are controlled to reversely rotate by a set angle to complete brake release.

Figure 4:
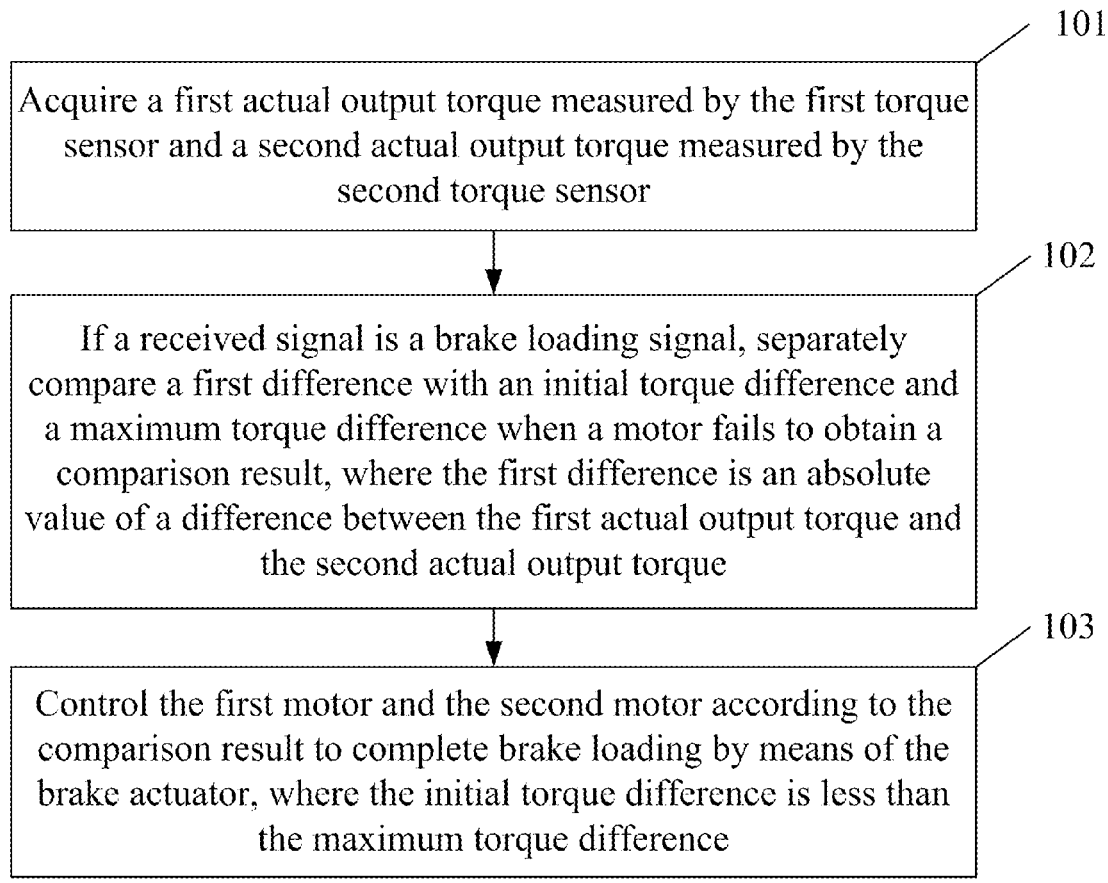
FIG. 4 is a flowchart of a configuration control method for an electronic mechanical brake-by-wire system according to embodiments of the present disclosure.

FIG. 4 is a flowchart of a configuration control method for an electronic mechanical brake-by-wire system according to embodiments of the present disclosure. Referring to FIG. 4, the control method includes:

step 101: acquire a first actual output torque measured by the first torque sensor and a second actual output torque measured by the second torque sensor;

step 102: if a received signal is a brake loading signal, separately compare a first difference with an initial torque difference and a maximum torque difference when a motor fails to obtain a comparison result, where the first difference is an absolute value of a difference between the first actual output torque and the second actual output torque; and step 103: control the first motor and the second motor according to the comparison result to complete brake loading by means of the brake actuator, where the initial torque difference is less than the maximum torque difference.

In step 103, the controlling the first motor and the second motor according to the comparison result specifically includes:

1) When the comparison result is that the first difference is less than the initial torque difference ($|T_1-T_2|<T_{min}$), the two motors operate normally, the closed-loop control of the motors is depended, synchronous compensation coordination is not needed, and therefore, a current output torque of the first motor and a current output torque of the second motor are maintained, where $T_1$ is the output torque (first actual output torque) of the first motor, $T_2$ is the output torque (second actual output torque) of the second motor, and $T_{min}$ is the initial torque difference of synchronous torque control of the two motors.

2) When the comparison result is that the first difference is greater than or equal to the initial torque difference and less than the maximum torque difference ($T_{min} \leq |T_1-T_2| < T_{max}$), the output torques of the two motors are asynchronous, synchronous compensation coordination needs to be performed on the torques through the torque compensator in the ECU, and therefore, synchronous compensation adjustment is respectively performed on an output torque of the first motor and an output torque of the second motor, where $T_{max}$ is the maximum torque difference when a motor fails. The process of the synchronous compensation adjustment is as follows:

i) calculate torque compensation amounts of the motors according to the first difference and compensation variable coefficients of the motors and on the basis of the following computational formula:

$$T_{ni} = c_i(a_i + b_i)|T_1 - T_2|(i = 1, 2);$$

where $T_{ni}$ is a torque compensation amount of the i-th motor; $a_i$, $b_i$, and $c_i$ are all compensation variable coefficients of the i-th motor; and $c_i$ is determined by motor torque output characteristics; $a_i=-\text{sign}[T_1-T_a/2-T_{min}]$, and $b_i=\text{sign}[T_a/2-T_1-T_{min}]$, where $T_1$ is an actual output torque of the i-th motor; the target output torque of a single motor is: $T_{a1}=T_{a2}=T_a/2$, that is, both the first target brake torque and the second target brake torque are $T_a/2$; the actual output torques of the two motors are $T_1$ and $T_2$; and the total actual output torque is $T=T_1+T_2$.

3) When the comparison result is that the first difference is greater than or equal to the maximum torque difference ($|T_1-T_2|>T_{max}$), the output torques of the two motors are severely asynchronous, the ECU is required to determine a failed motor, control the failed motor to stop operating and control a normal motor to output according to a target torque, where the target torque is a sum of a first target brake torque of the first motor and a second target brake torque of the second motor. The step is specifically as follows:

when a second difference is greater than or equal to the maximum torque difference and a third difference is less than the maximum torque difference (when $|T_1-T_a/2| \geq T_{max}$ & $|T_2-T_a/2|<T_{max}$), the first motor is abnormal, the first motor is stopped operating, a motor abnormality alarm indication is given, a synchronous compensation coordination function of the two motors is turned off, and the second motor outputs quickly according to the target torque $T_n$ (the first motor is the failed motor, and the second motor is the normal motor), where the second difference is an absolute value of a difference between the first actual output torque and a set torque, the third difference is an absolute value of a difference between the second actual output torque and the set torque, and the set torque is half of the target torque.

When the third difference is greater than or equal to the maximum torque difference and the second difference is less than the maximum torque difference ($|T_2-T_d/2|\geq T_{max}$ & $|T_1-T_d/2|<T_{max}$), the second motor is abnormal, the second motor is stopped operating, the motor abnormality alarm indication is given, the synchronous compensation coordination function of the two motors is turned off, and the first motor outputs quickly according to the target torque $T_n$ (the second motor is the failed motor, and the first motor is the normal motor).

The simultaneous failure of the two motors is not considered.

In an example, after step 101, the control method further includes:

if a received signal is a brake release signal, determine whether both the first actual output torque and the second actual output torque are zero, and if so, control both the first motor and the second motor to reversely rotate by a set angle to complete brake release by means of the brake actuator.

In an example, before step 101, the control method further includes:

if a received signal is a brake loading signal, send a first target brake torque signal to the first motor, and send a second target brake torque signal to the second motor; and when a brake release signal is received, send a first brake release signal to the first motor, and send a second brake release signal to the second motor.

The configuration control method for an electronic mechanical brake-by-wire system in the present embodiment has the following advantages:

1) During normal brake loading, the two motors operate at the same time, such that each motor is under a lower load condition, which can greatly prolong the service life of a single motor.

2) The torque sensors can monitor the torque output states of the motors in real time, and control is performed according to the comparison result of the output torques of the motors, such that the control of the brake performance of the motors is more accurate and direct.

3) The synchronous compensation function of the torque compensator can make the output torques of the two motors smooth and stable.

4) When braking is released, the motors reversely rotate until the torque outputs are zero and continues rotate reversely by a fixed angle, thereby achieving automatic compensation for a brake clearance.

5) The two motors are controlled by two independent sets of controllers. The two are physically isolated from each other without interference and are redundant with each other. This can avoid brake failure caused by the failure of a motor, a circuit, and a torque sensor on one side, thereby improving the reliability of a brake system.

The present disclosure further provides a configuration control system for an electronic mechanical brake-by-wire system, where the control system is for a dual-synchronous-motor electronic mechanical brake-by-wire system configuration, and the dual-synchronous-motor electronic mechanical brake-by-wire system configuration includes:

an ECU, a first motor, a second motor, a first torque sensor, a second torque sensor, and a brake actuator, where the ECU is electrically connected to the first motor and the second motor; the first torque sensor is connected to an output shaft of the first motor; the second torque sensor is connected to an output shaft of the second motor; both the first torque sensor and the second torque sensor are electrically connected to the ECU; and both an output shaft of the first torque sensor and an output shaft of the second torque sensor are connected to the brake actuator.

During brake loading, the ECU sends target brake torque signals to the first controller and the second controller respectively, and controls the first motor and the second motor of the same model to generate brake torque at the same time. Output shafts of the two motors are respectively connected to two torque sensors for detection and feedback of output torques of the motors. Output shafts of the torque sensors are connected through gears to superimpose the torques and then transmit same to a planetary gear reducer. An output shaft of the planetary gear reducer is connected to a ball screw, and the torque is transmitted to a piston through translational motion of a screw nut to squeeze a brake caliper, thereby completing brake loading. During brake release, the ECU sends brake release signals to the first controller and the second controller respectively, and the two motors reversely rotate until the torque sensors monitor that the output torques are zero, and continuous rotating reversely by a fixed angle to complete brake release and implement automatic adjustment of a brake clearance.

Figure 5:
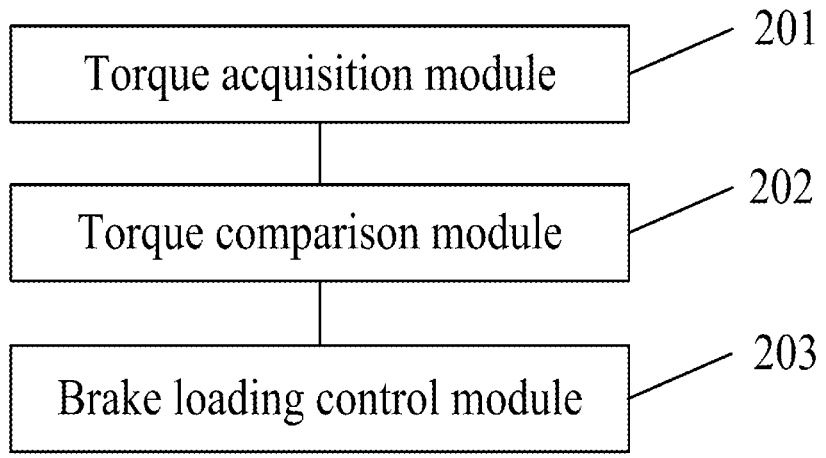
FIG. 5 is a structural diagram of a configuration control system for an electronic mechanical brake-by-wire system according to embodiments of the present disclosure.

Referring to FIG. 5, the control system includes:

a torque acquisition module 201, configured to acquire a first actual output torque measured by the first torque sensor and a second actual output torque measured by the second torque sensor;

a torque comparison module 202, configured to separately compare, if a received signal is a brake loading signal, a first difference with an initial torque difference and a maximum torque difference when a motor fails to obtain a comparison result, where the first difference is an absolute value of a difference between the first actual output torque and the second actual output torque; and a brake loading control module 203, configured to control the first motor and the second motor according to the comparison result to complete brake loading by means of the brake actuator, where the initial torque difference is less than the maximum torque difference.

In one example, the brake loading control module 203 specifically includes:

a motor control unit, configured to maintain, when the comparison result is that the first difference is less than the initial torque difference, a current output torque of the first motor and a current output torque of the second motor;

a synchronous compensation unit, configured to respectively perform, when the comparison result is that the first difference is greater than or equal to the initial torque difference and less than the maximum torque difference, synchronous compensation adjustment on an output torque of the first motor and an output torque of the second motor; and a failed motor determination unit, configured to determine, when the comparison result is that the first difference is greater than or equal to the maximum torque difference, a failed motor, control the failed motor to stop operating, and control a normal motor to output according to a target torque, where the target torque is a sum of a first target brake torque of the first motor and a second target brake torque of the second motor.

In an example, the synchronous compensation unit specifically includes:

a compensation amount calculation sub-unit, configured to calculate torque compensation amounts of the motors according to the first difference and compensation variable coefficients of the motors; and a motor compensation sub-unit, configured to compensate for the output torque of the first motor according to the torque compensation amount of the first motor, and compensate for the output torque of the second motor according to the torque compensation amount of the second motor.

The configuration control system for an electronic mechanical brake-by-wire system in the present embodiment can achieve synchronous and precise control of a brake force.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed:

1. A configuration control method for an electronic mechanical brake-by-wire system, wherein the control method is used for a dual-synchronous-motor electronic mechanical brake-by-wire system configuration, and the dual-synchronous-motor electronic mechanical brake-by-wire system configuration comprises:
   an electric control unit (ECU), a first motor, a second motor, a first torque sensor, a second torque sensor, and a brake actuator, wherein the ECU is electrically connected to the first motor and the second motor, the first torque sensor is connected to an output shaft of the first motor, the second torque sensor is connected to an output shaft of the second motor, both the first torque sensor and the second torque sensor are electrically connected to the ECU, and both an output shaft of the first torque sensor and an output shaft of the second torque sensor are connected to the brake actuator; and
   the control method comprises:
   acquiring a first actual output torque measured by the first torque sensor and a second actual output torque measured by the second torque sensor;
   in response to a received signal being a brake loading signal, separately comparing a first difference with an initial torque difference and a maximum torque difference when a motor fails to obtain a comparison result, wherein the first difference is an absolute value of a difference between the first actual output torque and the second actual output torque; and
   controlling the first motor and the second motor according to the comparison result to complete brake loading by means of the brake actuator, wherein the initial torque difference is less than the maximum torque difference.

2. The configuration control method for an electronic mechanical brake-by-wire system according to claim 1, wherein the controlling the first motor and the second motor according to the comparison result comprises:
   in response to the comparison result being that the first difference is less than the initial torque difference, maintaining a current output torque of the first motor and a current output torque of the second motor;
   in response to the comparison result being that the first difference is greater than or equal to the initial torque difference and less than the maximum torque difference, respectively performing synchronous compensation adjustment on an output torque of the first motor and an output torque of the second motor; and
   in response to the comparison result being that the first difference is greater than or equal to the maximum torque difference, determining a failed motor, controlling the failed motor to stop operating, and controlling a normal motor to output according to a target torque, wherein the target torque is a sum of a first target brake torque of the first motor and a second target brake torque of the second motor.

3. The configuration control method for an electronic mechanical brake-by-wire system according to claim 2, wherein the respectively performing synchronous compensation adjustment on an output torque of the first motor and an output torque of the second motor comprises:
   calculating torque compensation amounts of the motors according to the first difference and compensation variable coefficients of the motors; and
   compensating for the output torque of the first motor according to the torque compensation amount of the first motor, and compensating for the output torque of the second motor according to the torque compensation amount of the second motor.

4. The configuration control method for an electronic mechanical brake-by-wire system according to claim 2, wherein the determining a failed motor comprises:
   in response to a second difference being greater than or equal to the maximum torque difference and a third difference being less than the maximum torque difference, determining that the first motor is the failed motor and the second motor is the normal motor, wherein the second difference is an absolute value of a difference between the first actual output torque and a set torque, the third difference is an absolute value of a difference between the second actual output torque and the set torque, and the set torque is half of the target torque; and
   in response to the third difference being greater than or equal to the maximum torque difference and the second difference being less than the maximum torque difference, determining that the second motor is the failed motor and the first motor is the normal motor.

5. The configuration control method for an electronic mechanical brake-by-wire system according to claim 1, after the acquiring a first actual output torque measured by the first torque sensor and a second actual output torque measured by the second torque sensor, further comprising:
   in response to a received signal being a brake release signal, determining whether both the first actual output torque and the second actual output torque are zero and, in response to both the first action output torque and the second actual output torque being zero, controlling both the first motor and the second motor to reversely rotate by a set angle to complete brake release by means of the brake actuator.

6. The configuration control method for an electronic mechanical brake-by-wire system according to claim 1, before the acquiring a first actual output torque measured by the first torque sensor and a second actual output torque measured by the second torque sensor, further comprising:
in response to a received signal being a brake loading signal, sending a first target brake torque signal to the first motor, and sending a second target brake torque signal to the second motor.

7. The configuration control method for an electronic mechanical brake-by-wire system according to claim 2, before the acquiring a first actual output torque measured by the first torque sensor and a second actual output torque measured by the second torque sensor, further comprising:
in response to a brake release signal being received, sending a first brake release signal to the first motor, and sending a second brake release signal to the second motor.

8. A configuration control system for an electronic mechanical brake-by-wire system, wherein the control system is for a dual-synchronous-motor electronic mechanical brake-by-wire system configuration, and the dual-synchronous-motor electronic mechanical brake-by-wire system configuration comprises:
an ECU, a first motor, a second motor, a first torque sensor, a second torque sensor, and a brake actuator, wherein the ECU is electrically connected to the first motor and the second motor, the first torque sensor is connected to an output shaft of the first motor, the second torque sensor is connected to an output shaft of the second motor, both the first torque sensor and the second torque sensor are electrically connected to the ECU, and both an output shaft of the first torque sensor and an output shaft of the second torque sensor are connected to the brake actuator; and
the control system comprises:
a torque acquisition module, configured to acquire a first actual output torque measured by the first torque sensor and a second actual output torque measured by the second torque sensor;
a torque comparison module, configured to separately compare, in response to a received signal being a brake loading signal, a first difference with an initial torque difference and a maximum torque difference when a motor fails to obtain a comparison result, wherein the first difference is an absolute value of a difference between the first actual output torque and the second actual output torque; and
a brake loading control module, configured to control the first motor and the second motor according to the comparison result to complete brake loading by means of the brake actuator, wherein the initial torque difference is less than the maximum torque difference.

9. The configuration control system for an electronic mechanical brake-by-wire system according to claim 8, wherein the brake loading control module specifically comprises:
a motor control unit, configured to maintain, in response to the comparison result being that the first difference is less than the initial torque difference, a current output torque of the first motor and a current output torque of the second motor;
a synchronous compensation unit, configured to respectively perform, in response to the comparison result being that the first difference is greater than or equal to the initial torque difference and less than the maximum torque difference, synchronous compensation adjustment on an output torque of the first motor and an output torque of the second motor; and
a failed motor determination unit, configured to determine, in response to the comparison result being that the first difference is greater than or equal to the maximum torque difference, a failed motor, control the failed motor to stop operating, and control a normal motor to output according to a target torque, wherein the target torque is a sum of a first target brake torque of the first motor and a second target brake torque of the second motor.

10. The configuration control system for an electronic mechanical brake-by-wire system according to claim 9, wherein the synchronous compensation unit comprises:
a compensation amount calculation sub-unit, configured to calculate torque compensation amounts of the motors according to the first difference and compensation variable coefficients of the motors; and
a motor compensation sub-unit, configured to compensate for the output torque of the first motor according to the torque compensation amount of the first motor, and compensate for the output torque of the second motor according to the torque compensation amount of the second motor.

* * * * *